United States Patent
Biren et al.

(10) Patent No.: US 10,782,134 B1
(45) Date of Patent: Sep. 22, 2020

(54) EPHEMERIDES-FREE CELESTIAL NAVIGATION

(71) Applicant: The Charles Stark Draper Laboratory, Inc., Cambridge, MA (US)

(72) Inventors: Marvin A. Biren, Chestnut Hill, MA (US); Simone B. Bortolami, Belmont, MA (US); Benjamin J. Bresler, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 201 days.

(21) Appl. No.: 16/037,094

(22) Filed: Jul. 17, 2018

Related U.S. Application Data

(60) Provisional application No. 62/533,235, filed on Jul. 17, 2017.

(51) Int. Cl.
*G01C 21/02* (2006.01)

(52) U.S. Cl.
CPC .................................. *G01C 21/025* (2013.01)

(58) Field of Classification Search
None
See application file for complete search history.

(56) References Cited

U.S. PATENT DOCUMENTS

| | | | |
|---|---|---|---|
| 2011/0004405 A1* | 1/2011 | Hutchin | G01S 5/163 701/513 |
| 2017/0131096 A1* | 5/2017 | Karlov | G01C 21/165 |

OTHER PUBLICATIONS

Willhite, W.B., *An Analysis of ICBM Navigation Using Optical Observations of Existing Space Objects*, CSDL-T-1484, Masters Thesis, Massachusetts Institute of Technology, Jun. 2004, 123 pages.
http://math.stackexchange.com/questions/163920/how-to-find-an-elllispe-given-five-points, May 7, 2017, 3 pages.

* cited by examiner

*Primary Examiner* — Genna M Mott
*Assistant Examiner* — Melanie J Patrick
(74) *Attorney, Agent, or Firm* — Sunstein LLP

(57) ABSTRACT

Methods for use in celestial navigation system use multiple star observations from an unknown observer location using an observer camera with an observational field of view along a boresight axis and a focal plane perpendicular to the boresight axis. An observer local ECI coordinate system is determined from the star observations. Then for each of multiple observable objects in orbit around the Earth, multiple optical angular measurements relative to stars are performed over time to estimate its orbital ellipse, and its focus at the center of the Earth. From the multiple focus estimates, a position of the center of the Earth is estimated in the observer local coordinate system without use of object ephemeris data. From the estimated position of the center of the Earth, a radius vector to the observer is determined that represents the estimated observer location in Earth centered Earth fixed coordinates.

8 Claims, 4 Drawing Sheets
(1 of 4 Drawing Sheet(s) Filed in Color)

EPHEMERIDES-FREE CELESTIAL NAVIGATION

This application claims priority from U.S. Provisional Patent Application 62/533,235, filed Jul. 17, 2017, which is incorporated herein by reference in its entirety.

STATEMENT REGARDING FEDERALLY SPONSORED RESEARCH OR DEVELOPMENT

This invention was made with government support under Grant No. N00030-16-C-0014 awarded by the Department of Defense. The U.S. government has certain rights in the invention.

TECHNICAL FIELD

The present invention relates to an improved method for use in a celestial navigation system.

BACKGROUND ART

Celestial navigation techniques have been in use since ancient times. More recently, it is known that it is possible to derive an unknown position by observing an orbiting satellite against a star-field background. Angles between an apparent position of the satellite and (assumed known) stars provide information on the location of the observer. This requires that the position of the satellite be known very accurately. Given that satellite orbits can be predicted using well-known physical equations, e.g., Kepler's and Newton's laws, this technique can provide a practical method of navigation.

One system known as "SkyMark," was developed at the Charles Stark Draper Laboratory, Inc. ("Draper") for use in a variety of applications, including autonomous spacecraft navigation. See Willhite, W. B., *An Analysis of ICBM Navigation Using Optical Observations of Existing Space Objects*, CSDL-T-1484, Masters Thesis, Massachusetts Institute of Technology, June 2004; Shearer, J., et al., "*Sky-Mark—A Technique for Enhancing Precision Missile Navigation*," AIAA Missile Sciences Conf., (November, 2004), both of which are incorporated herein by reference in their entireties. As shown in FIG. 1, at some time $t_1$, the system takes a Sighting #1 to observe a first selected satellite 101 and the nearby star field background 102 as they traverse the field of view. At some subsequent time $t_2$, a second Sighting #2 is taken of another second selected satellite 103 and its nearby star background 104. Based on these observations, a computer calculates the angular location of the selected satellites 101 and 103 on the celestial sphere in inertial space at the time of each observation within some position error ellipsoid 105 and 106. The ephemeris of each of the selected satellites 101 and 103 allows the computer to determine the position in inertial space of each of the selected satellites 101 and 103 at times $t_1$ and $t_2$ and the distance between them 107 at the common time $t_2$. This in turn leads to the determination by triangulation of the observer's location in inertial space, which can be used to update a previous inertial position of the observer. The concept of using satellite sightings together with inertial guidance for navigation purposes was discussed by Brown et al. in "*Long Duration Strapdown Stellar-Inertial Navigation using Satellite Tracking*," Position Location and Navigation Symposium, 1992. Record. 500 Years after Columbus-Navigation Challenges of Tomorrow. IEEE PLANS'92, IEEE, pp. 194-201 (1992), which is incorporated herein by reference.

Geolocation of an observer by measurement as in Sky-Mark of orbiting bodies and stars requires usage of star catalogs and knowledge of the satellite ephemerides, which might not be readily available.

SUMMARY

Embodiments of the present invention are directed to methods for use in celestial navigation system in which multiple star and orbiting satellite observations are performed from an unknown observer location using an observer camera with an observational field of view along a boresight axis and a focal plane perpendicular to the boresight axis. An observer local coordinate system is determined from the star observations as measured on the focal plane, the time of measurement, and the star catalog. In a projective geometry embodiment of the invention, for each of multiple observable objects in orbit around the Earth: a. multiple optical measurements are performed over time to determine a local curvature of an elliptical arc of a projection of an object orbit onto the focal plane, b. the local curvature is used to estimate an elliptical shape of the object orbit and an ellipse focus position in the focal plane, and c. a focus projection is made from the ellipse focus position parallel to the boresight axis at a particular time to the center of the Earth. From the crossing of the resulting multiple focus projections a position of the center of the Earth is estimated in the observer local coordinate system without use of object ephemeris data. From the estimated position of the center of the Earth, a radius vector is determined from the center of the Earth to the observer that represents the observer location in Earth-centered fixed coordinates.

In specific embodiments, the determined observer location is used to update a prior observer location value in the celestial navigation system. Determining the observer local coordinate system may include determining co-latitude and longitude angles for the observer location, and/or determining angular displacement of the plurality of star observations from star location information in a star data catalog. The estimating step may be based on a set of equations representing vector triangles each with vertices at the orbiting object, the observer position, and the center of the Earth at one or more different times. Alternatively, the estimating step may be based on a Kalman filter configured to iteratively estimate the elliptical shape of the object orbit and the ellipse focus position in the focal plane. In addition or alternatively, the estimating step may be based on a Kalman filter configured to directly estimate the observer position and velocity to include additional error states representing the observer's unknown position and velocity, and additional measurements of satellite lines of sight relative to star locations, and their times. The star and satellite observations may specifically be in the visible or infrared ranges of the optical spectrum.

Embodiments of the present invention also include a celestial navigation system that uses a method according to any of the foregoing.

DETAILED DESCRIPTION

Embodiments of the present invention are directed to celestial navigation with improved accuracy beyond that of existing stellar-inertial navigation and guidance systems by using in-flight visible or infrared optical sightings of satellites in low-Earth orbit without use of satellite ephemerides. This can result in a navigation and guidance system with the only needed operational inputs being time, destination position, and approximate starting position. This can reduce system operational support requirements, support system infrastructure, and life cycle cost.

Figure 1:
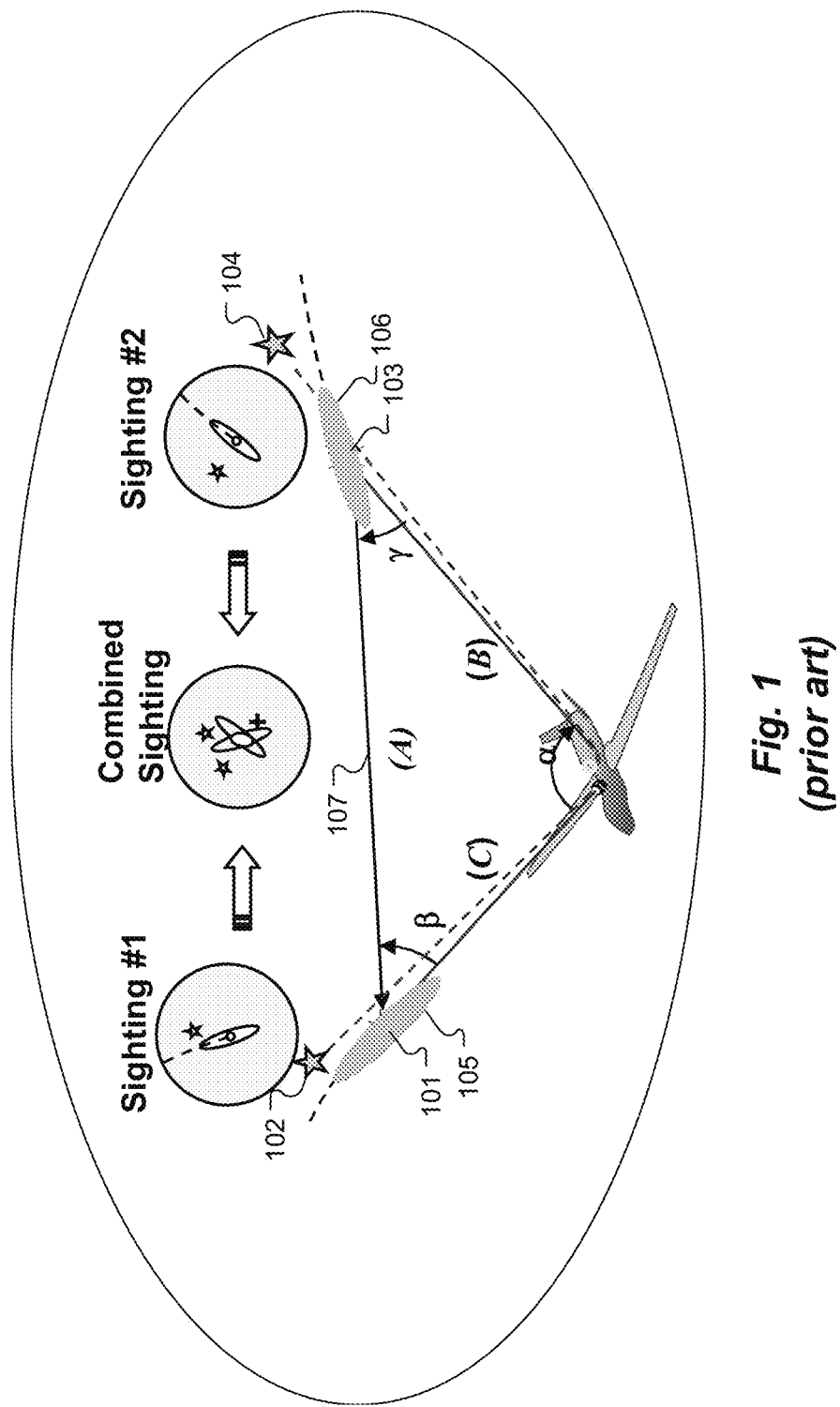
FIG. 1 shows principles of operation of SkyMark navigation according to the prior art.
Figure 2:
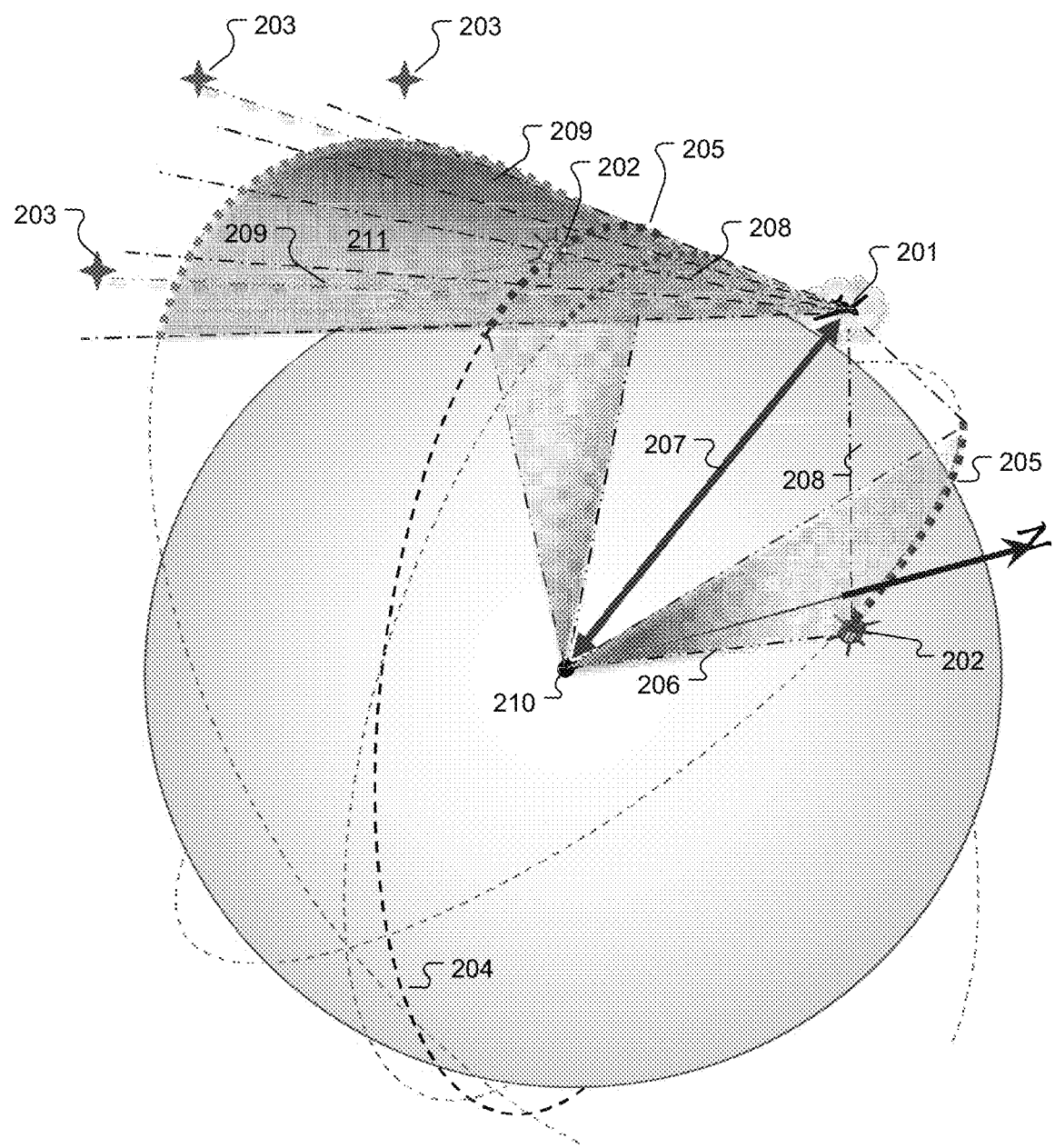
FIG. 2 shows observation of each of the observable objects that are the subject of the measurements that the system makes.

FIG. 2 illustrates the observations of the satellites that typically would be the observable objects that are the subject of the measurements that the system makes. An observer camera at the observer position 201 makes multiple optical observations over time of multiple observable objects 202 (e.g., satellites), each of which is apparently near one or more background stars 203, and all of which share a common Earth-centered inertial reference (ECI) frame. In FIG. 2, the object line of sight 208 from the observer position 201 to the observable objects 202 are dash dot blue lines, and the star line of sight 209 from the observer position 201 to the background stars are dot dot dash orange lines.

The optical measurements of the observable objects 202 over time allow determination of an observed object trajectory 205 (shown in thick red dashes) of the elliptical orbit 204 (shown in black dashes) of the observable object 202. The observed object trajectories 205 are used to estimate the overall shape of the object's elliptical orbit 204. Specifically, the time of observation and sighting angles from the observer position 201 along the star lines of sight 209 to the stars 203 in the field of view provide a common inertial attitude Earth-centered inertial reference (ECI)-derived by coordinate transformation from the associated star catalog Right Ascension (RA), and Declination (Dec) values in Earth centered Earth fixed (ECEF) coordinates, and time of sighting. Sighting angles from the observer position 201 along the object lines of sight 208 to the observable objects 202 are measured relative to the star lines of sight 209 in the same field of view, thereby avoiding boresight errors. The observable objects 202 are in inertial orbits with radius vectors 206 (shown in dot dot dash black lines) having a common focus at the Earth's center 210. Successive object lines of sight 208 to each observable object 202 define a conical observation fan 211 (shown in light gray shading) that represents all possible orbital trajectories of the observed object 202. Given the conical observation fan 211 and the resulting observed object trajectory 205, only one elliptical orbit 204 will satisfy the Kepler orbital angular rate condition at all points. The reciprocal of the radius vector in the observer's coordinate system to the focus of the elliptical orbit 204 at the Earth's center 210 gives the observer's position. in ECI without use of object ephemeris data.

Figure 3:
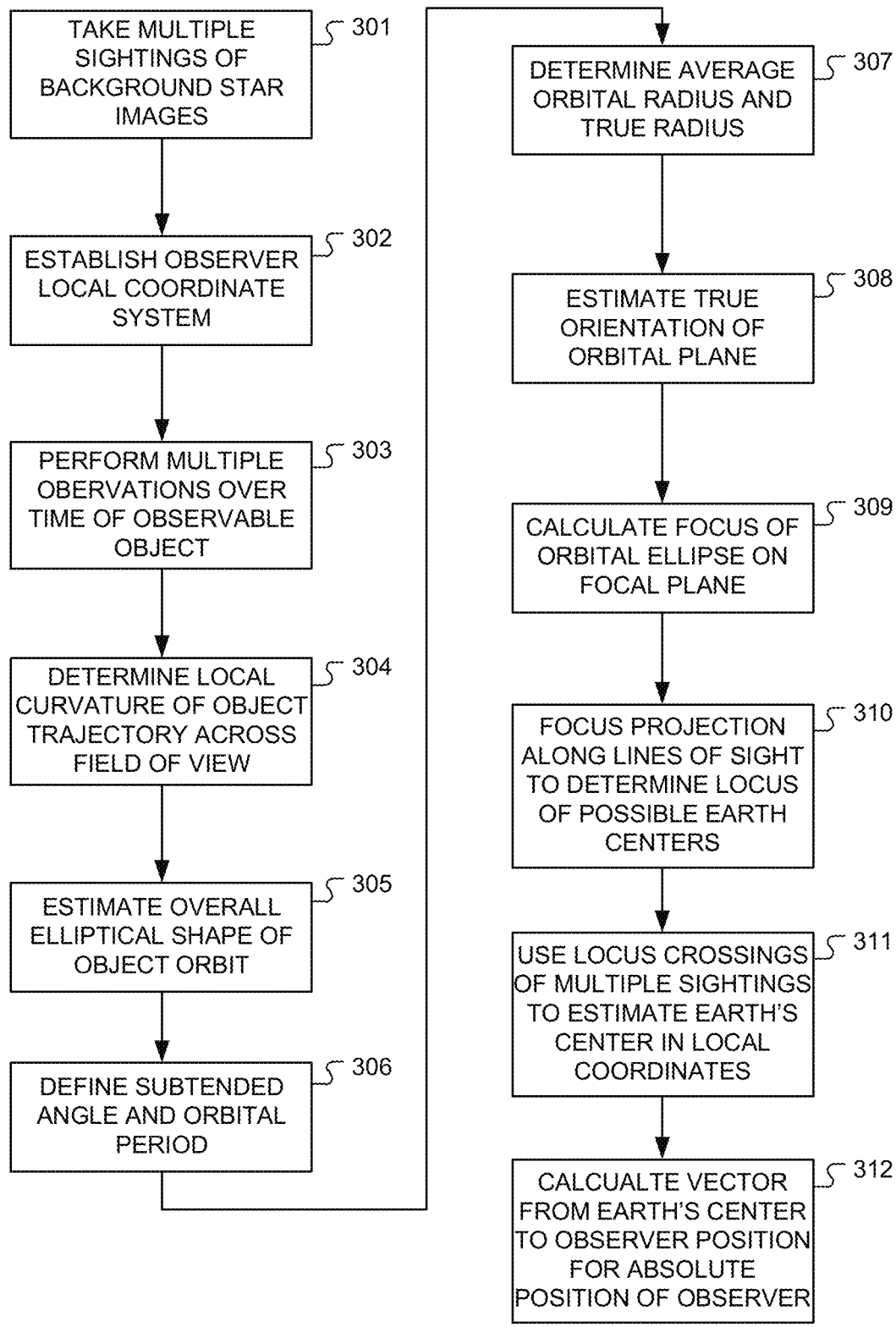
FIG. 3 shows various logical steps in an algorithm for ephemerides-free calculation an observer position by optical observations of one or more observable objects in low-earth orbit.
Figure 4:
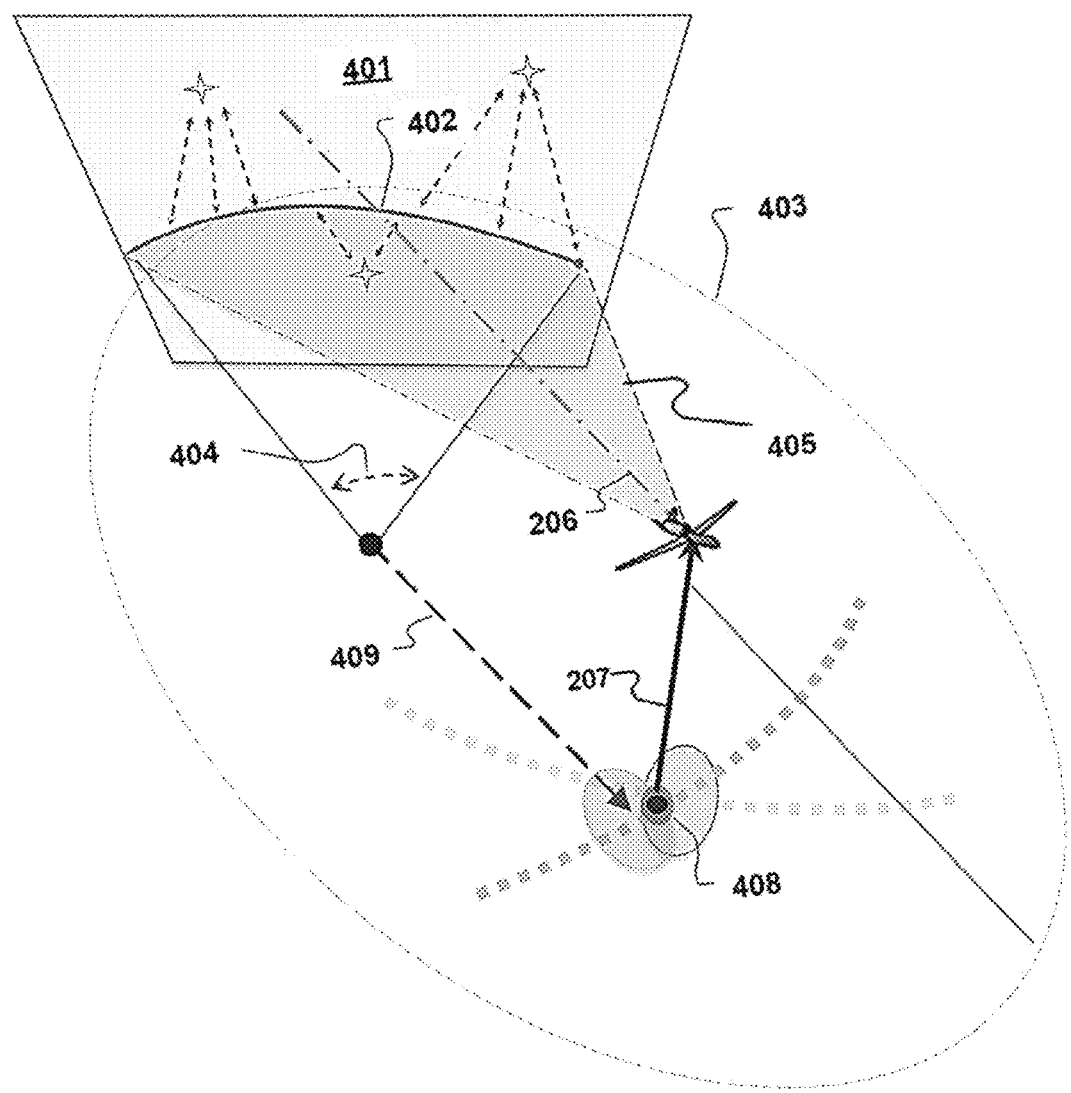
FIG. 4 illustrates the observational process associated with an algorithm as in FIG. 3.

For illustrative purposes, FIG. 3 is a flow chart showing various logical steps in one specific algorithm to develop a radius vector from the Earth's center to the observer's position. First, step 301, star sightings are taken by the observer camera of background star images in the focal plane perpendicular to the boresight axis. For example, given access to a star data catalog and times of observation, an observer can measure three or more direction vectors with respect to the fixed stars at three or more different times from an unknown position(s). From the star data catalog these star sightings establish the observer's local coordinate system, (but not origin) of an Earth-centered inertial reference (ECI) frame, step 302. FIG. 4 shows the camera field of view 401 in ECI coordinates.

Multiple optical observations over time of the trajectory of an observable object in low-Earth orbit against the background star images, step 303, allows determination of a local curvature 402 of the elliptical arc of the object orbit that is projected onto the camera focal plane, step 304, by angular displacement of the object images from the star image positions. The focal plane local curvatures 402 are used to estimate the overall elliptical shape of the complete object orbit 403, step 305. More specifically, the trajectory of the local curvature 402 is extended over $2\pi$ and defines the eccentricity and relative foci positions of the object orbit 403 in the field-of-view coordinates. It is known that five points can unambiguously define an ellipse, and with a wide field-of-view observer camera there will be many observational points for each orbital trajectory to define an osculating ellipse, its eccentricity, axes, and foci. This may be done using a Kalman filter and one specific example of an appropriate specific procedure for this can be found at: http://math.stackexchange.com/questions/163920/how-to-find-an-ellipse-given-five-points (with references to Direct Linear Transformation and Reduced Singular Value Decomposition).

The true subtended angle 404 of the trajectory image and the orbital period can be defined, step 306, from the transit time of the observable object across the field-of-view relative to the entire orbital circumference. An average orbital radius can be determined from the orbital period, and the true radius 405 of the object sightings in the field-of-view can be determined from the curvature eccentricity, step 307. More specifically, the period of an elliptical orbit is represented as $$t = \frac{2\pi}{\sqrt{\mu}} a^{3/2},$$

where a is the semi-major axis of the ellipse. The area of an ellipse is $A = \pi a^2 \sqrt{1-e^2}$, which also is the area of a circular orbit of equal period, and radius $R = a \sqrt[4]{1-e^2}$, where e is eccentricity. The area of a sector of an elliptical orbit (the local curvature observed across the field-of-view) is thus $A_\varphi = (\varphi/2) a^2 \sqrt{1-e^2}$, with transit time $$t_\varphi = \frac{\varphi}{\sqrt{\mu}} a^{3/2},$$

where $\varphi$ si the angle index that defines the sector and $\mu$ is the standard gravitational parameter. The true size of the semi-major axis of the ellipse can then be scaled by $a_{true} = a_{projected} t_{measured}^{2/3}$ independently of the included angle. The orbital circumference may be calculated from the approximation, $C \approx \pi[1.5(a+b) - \sqrt{ab}]$, or directly from the elliptical integral, $C\int_{\varphi 1}^{\varphi 2} = a\int_{\varphi 1}^{\varphi 2} \sqrt{(1-e^2(\sin\varphi)^2)} d\varphi$, which then can also be used in conjunction with the instantaneous orbital velocities for the included angle and radii of the local curvature in the field-of-view, where b is the second axis of the ellipse. The true orientation of the orbital plane can also be estimated from the variation in instantaneous velocity of the observable object across the field-of-view, step 308.

The local curvature 402 defines the parameters of the projected ellipse of the object orbit 403 relative to the stellar inertial frame that define the angles to the ends of the major and minor axes and the included angle of the projected ellipse. This in turn allows calculation of the circumference of the projected ellipse (steps 306-308), and the relative length and location of the arc of the local curvature 402 around the projected ellipse. The ratio of $2\pi$ to the subtended angle 404 represents a scale factor by which to multiply the measured time to traverse the true trajectory arc of the local curvature 402 to derive the true period of the object orbit 403 (step 307). The same ratio should match the ratio of the dimensions of the true ellipse to the calculated projected ellipse, and to the projection of the focus of the true ellipse onto the focal plane (step 309).

A projection of the focus 409 along the object line of sight direction passes through the Earth's center. So for a given sequence of object observations, a representative locus of possible Earth centers 408 can be defined, step 310. This all is repeated for other satellite sightings to develop multiple projections that through the Earth's center 408 from different angles. Their crossing establishes an estimate of the Earth's center 408 in the observer's ECI coordinate system, step 311. From that, the absolute position of the observer in the Earth's coordinate system is calculated as a vector 207 from the Earth's center 408 to the observer position, step 312.

For example, twelve or more equations can be written having as unknown the orbital parameters of the observed object, the ranges of the observer to the object at different times, and the three coordinates of the observer. Such equations represent the vector triangles composed of the orbiting object from the center of the Earth, the observer position from the center of the Earth, and the observer-body line of sight at different times, which all have to close to the null vector. A solver or minimization algorithm may be used to finds the solution of those equations. One simplification may be to assume the eccentricity of the orbit equal to zero (which suits most low Earth orbit satellites and may make the algorithm much simpler). The approximate position of the observer may be provided with an error from any type of navigation system and may be used as initial conditions in a Gaussian algorithm to compute first estimates of the orbital parameters of the observed object. Those preliminary estimates may be used as starting point for the minimization algorithm or numerical solver to solve the equations. A Kalman filter may be used to account for the motion of the observer with time in conjunction with the geometrical and algebraic schemes presented above.

In an alternative embodiment, the angular coordinates in ECI of the lines of sight of each successive measurement to each satellite and star, and the time associated with each measurement, may comprise the input to a Kalman filter (whether "scented" or "unscented") to iteratively estimate the orbital parameters of each satellite in turn. The calculations performed within the Kalman filter computer may use a new modification of the methods commonly used to estimate satellite orbits by optical sightings from known fixed positions on the Earth's surface, known colloquially as "angles-only methods" (described, for example, in *Fundamentals of Astrodynamics and Applications*, Fourth Edition. Sect. 7.3 (D. Vallado, Microcosm Press, 2013), which is incorporated herein by reference in its entirety). These modifications may include the addition of at least 6 states, representing the 3-dimentional ECI coordinates (X, Y, Z) of the unknown position and velocity of the observer, and at least the corresponding number of additional satellite line-of sight measurements and associated times, to the matrix representation of the computational problem so that the Kalman filter may additionally provide iterative estimates of the position and velocity of the moving observer directly, without requiring the separate determination of the relative positon of the Earth's center through methods of projective geometry, as described above. These may, in turn, be used to update the navigation state of the vehicle's inertial guidance system, using commonly known "loosely coupled", "tightly coupled", or "deeply integrated update techniques", as desired.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable, non-transitory storage media (e.g., read-only memory devices within a computer, such as ROM, or devices readable by a computer I/O attachment, such as CD-ROM or DVD disks), information alterably stored on tangible writable, non-transitory storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

What is claimed is:

1. A method for use in celestial navigation, the method comprising:

performing a plurality of star observations from an unknown observer location with an observer camera having an observational field of view along a boresight axis and a focal plane perpendicular to the boresight axis;

determining an observer local Earth-centered inertial coordinate system from the plurality of star observations;

for each of a plurality of observable objects in orbit around the Earth:

performing a plurality of optical measurements over time to determine a local curvature of an elliptical arc of a projection of an object orbit onto the focal plane, using the local curvature to estimate an elliptical shape of the object orbit and an ellipse focus position in the focal plane, and forming a focus projection parallel to the line of sight between the observer camera and the object from the ellipse focus position to the center of the Earth;

estimating from the resulting plurality of focus projections without use of object ephemeris data a position of the center of the Earth in the observer local Earth—centered inertial coordinate system; and from the estimated position of the center of the Earth determining a radius vector from the center of the Earth representing the observer location in Earth centered fixed coordinates.

2. The method according to claim 1, further comprising:

using the observer location from the radius vector to update a prior observer location value in the celestial navigation system.

3. The method according to claim 1, wherein determining the observer local coordinate system includes determining co-latitude and longitude angles for the observer location.

4. The method according to claim 1, wherein determining the observer local coordinate system includes determining angular displacement of the plurality of star observations from star location information in a star data catalog.

5. The method according to claim 1, wherein the estimating step is based on a set of equations representing vector triangles each with vertices at the orbiting object, the observer position, and the center of the Earth at one or more different times.

6. The method according to claim 1, wherein the estimating step is based on a Kalman filter configured to iteratively estimate the elliptical shape of the object orbit and the ellipse focus position in the focal plane.

7. The method according to claim 1, wherein the estimating step is based on a Kalman filter configured to directly estimate the observer position and velocity to include additional error states representing the observer's unknown position and velocity, and additional measurements of satellite lines of sight relative to star locations, and their times.

8. The method according to claim 1, wherein the plurality of star observations are optical or infrared observations.

* * * * *